(12) United States Patent
Barron et al.

(10) Patent No.: US 8,195,570 B1
(45) Date of Patent: Jun. 5, 2012

(54) GENERATION OF RECEIPTS FOR CHECK POINT OF SALE DEVICE

(75) Inventors: Tamila Barron, League City, TX (US); Bruce Dragt, Highlands Ranch, CO (US); Daniel Ahles, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 145 days.

(21) Appl. No.: 11/957,888

(22) Filed: Dec. 17, 2007

Related U.S. Application Data

(60) Provisional application No. 60/870,530, filed on Dec. 18, 2006.

(51) Int. Cl.
G06Q 40/00 (2012.01)
G07F 7/10 (2006.01)
H04L 9/32 (2006.01)
G11C 17/00 (2006.01)

(52) U.S. Cl. .............. 705/45; 705/33; 705/35; 705/39; 705/42; 705/44; 713/168; 365/96; 235/379

(58) Field of Classification Search ............... 235/379; 365/96; 382/115; 705/35, 39, 42, 33, 44, 705/45; 713/168
See application file for complete search history.

(56) References Cited

U.S. PATENT DOCUMENTS

| | | | |
|---|---|---|---|
| 5,175,682 A * | 12/1992 | Higashiyama et al. | 705/45 |
| 5,265,007 A * | 11/1993 | Barnhard et al. | 705/45 |
| 5,583,759 A | 12/1996 | Geer | |
| 5,717,868 A | 2/1998 | James | |
| 5,910,988 A | 6/1999 | Ballard | |
| 5,930,778 A | 7/1999 | Geer | |
| 5,936,219 A | 8/1999 | Yoshida et al. | |
| 6,032,137 A | 2/2000 | Ballard | |
| 6,129,272 A | 10/2000 | Yoshida et al. | |
| 6,189,785 B1 | 2/2001 | Lowery | |
| 6,363,361 B1 | 3/2002 | Lundberg | |
| 6,390,362 B1 | 5/2002 | Martin | |
| 6,547,132 B1 | 4/2003 | Templeton et al. | |
| 6,647,376 B1 * | 11/2003 | Farrar et al. | 705/45 |
| 6,827,260 B2 | 12/2004 | Stoutenburg et al. | |
| 7,349,557 B2 * | 3/2008 | Tibor | 382/115 |
| 2002/0042773 A1 * | 4/2002 | Fugitte et al. | 705/39 |
| 2002/0082962 A1 * | 6/2002 | Farris et al. | 705/35 |

(Continued)

OTHER PUBLICATIONS

Rules of the National Automated Clearing House Association became effective Jan. 1, 1977 (as amended on Sep. 28, 2007).*

(Continued)

*Primary Examiner* — Ella Colbert
*Assistant Examiner* — Barbara Amelunxen
(74) *Attorney, Agent, or Firm* — Kilpatrick Townsend & Stockton LLP

(57) ABSTRACT

In accordance with one embodiment of the invention, a system is provided that allows a point of sale device to capture the signature of a check writer at the time a check is presented for ACH processing. In accordance with another embodiment, a test can be made to compare optically read information from the face of a check against a negative database or a risk management database to reduce the risk of bad checks being processed by a merchant.

15 Claims, 8 Drawing Sheets

U.S. PATENT DOCUMENTS

| | | | |
|---|---|---|---|
| 2002/0120846 A1* | 8/2002 | Stewart et al. | 713/168 |
| 2003/0050892 A1* | 3/2003 | Clynes et al. | 705/45 |
| 2003/0055756 A1* | 3/2003 | Allan | 705/33 |
| 2003/0135454 A1* | 7/2003 | Keller et al. | 705/39 |
| 2004/0030644 A1* | 2/2004 | Shaper | 705/39 |
| 2004/0236688 A1 | 11/2004 | Bozeman | |
| 2005/0044039 A1* | 2/2005 | Greer et al. | 705/39 |
| 2005/0080729 A1* | 4/2005 | Shaper et al. | 705/39 |
| 2006/0187698 A1* | 8/2006 | Schmidt et al. | 365/96 |
| 2007/0022053 A1* | 1/2007 | Waserstein et al. | 705/42 |
| 2007/0095894 A1* | 5/2007 | Kerridge | 235/379 |
| 2007/0299775 A1* | 12/2007 | Algiene | 705/45 |
| 2008/0071683 A1* | 3/2008 | Hayden et al. | 705/45 |
| 2008/0071684 A1* | 3/2008 | Marshall et al. | 705/45 |
| 2008/0275820 A1* | 11/2008 | Joao et al. | 705/44 |

OTHER PUBLICATIONS

Nacha Rules for all members of Automated Clearing House Associations, Jan. 1, 1977.*

USPTO; Non-Final Office Action mailed Jun. 20, 2008 for U.S. Appl. No. 11/857,302.

USPTO; Non-Final Office Action mailed Sep. 3, 2008 for U.S. Appl. No. 11/857,309.

USPTO; Final Office Action mailed Oct. 24, 2008 for U.S. Appl. No. 11/857,302.

USPTO; Final Office Action mailed Feb. 23, 2009 for U.S. Appl. No. 11/857,309.

USPTO; Advisory Action mailed Mar. 19, 2009 for U.S. Appl. No. 11/857,302.

* cited by examiner

GENERATION OF RECEIPTS FOR CHECK POINT OF SALE DEVICE

CROSS-REFERENCES TO RELATED APPLICATIONS

This application claims the benefit 35 USC §119(e) of U.S. Patent Application No. 60/870,530, filed on Dec. 18, 2006, entitled "Generation of Receipts for Check Point of Sale Device", and the above-mentioned application is hereby incorporated by reference in its entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND

New rules implemented by the National Automated Clearinghouse Association (NACHA) allow a merchant to receive physical checks and then image the physical checks in the back office so that the data collected from the imaged checks can electronically be submitted for clearing to the Automated Clearinghouse (ACH). This eliminates the physical submission of the check instruments themselves and allows electronic files to be used for processing the settlement instead. This is convenient for the merchant and the customer in that the check can simply be obtained as payment without any additional delay. Under NACHA's rules, the merchant is required to notify the customer that the checks will be processed as an ACH transaction. However, the new rules do not require that a signature be obtained from the customer to indicate the customer's approval; all that is required is that a posted notice be given to the customer and/or a takeaway.

However, merchants are accustomed to collecting service fees on checks that are returned for insufficient funds. With the inception of electronic check processing in 1997 with Point-of-Purchase (POP) transactions, the service fees were allowed to be electronically deducted from the checkwriter's account, as outlined in the NACHA rules. However, under the Back Office Check Conversion (BOC) rules, a merchant may not electronically collect this returned check fee without first obtaining a signature from the customer, indicating the customer's agreement that the fee may be collected by the merchant. As a result, merchants will be less likely to implement this mode of processing checks since the merchants cannot readily obtain a signature from the customers and thus will lose the opportunity to electronically collect the returned check fee when applicable.

Furthermore, some merchants may not want to collect the consumer signature for every transaction, since the customer's signature is not necessary for authorizing settlement. However, such merchants will likely still want to be able to collect other customer signatures in order be able to electronically collect the returned check fee for some transactions. Essentially, some merchants would like to be able to collect consumer signatures for some transactions but not every transaction, as well as for some customers but not every customer.

Thus, there is a need for a system that can overcome at least some of the deficiencies in electronic processing of checks.

SUMMARY

According to one embodiment of the invention, a system is provided that processes a check by receiving a check from a check presenter; displaying a notice to indicate to said check presenter that said presenter can be charged electronically a fee if said check is returned; obtaining a signature from said check presenter acknowledging notification of said fee.

In accordance with another embodiment of the invention, a system is provided that processes a check by receiving a check from a check presenter; utilizing a computer to assess a risk of said check being returned for insufficient funds; displaying a notice to indicate to said presenter that said presenter can be charged electronically a fee if said check is returned; and then obtaining a signature from said check presenter acknowledging notification of said fee.

In yet another embodiment of the invention, a system is provided that processes a check by receiving a check from a check presenter; utilizing a computer to assess a risk of said check being returned for insufficient funds; accepting said check from said check presenter without obtaining a signature from said check presenter acknowledging notification of an electronic return fee.

According to another embodiment of the invention, a system is provided that processes a check by receiving a check from a check presenter; displaying a notice to indicate to said check presenter that said presenter can be charged electronically a fee if said check is returned; obtaining a signature from said check presenter acknowledging notification of said fee; and linking an image of said signature with said check.

Further embodiments of the invention will be apparent from review of the following specification and figures.

DETAILED DESCRIPTION

New rules proposed by NACHA require that a check writer agree by his/her signature to be electronically charged for return fees on checks that are returned after being processed as an ACH settlement transaction. While NACHA allows ACH processing of checks obtained at the point of sale device by merely providing notice to the customer that the check will be processed via ACH processing, NACHA requires that a signature be obtained from the customer if the merchant wants to electronically charge a return fee on returned checks. Thus, the merchant is faced with the difficult decision of whether to request a signature from a customer at the time the check is presented at the point of sale device, or whether to not request such a signature. By not requesting such a signature, the merchant provides a more convenient experience for the customer presenting the check as well as for customers waiting in the queue behind the customer who presents the check. However, by requesting and obtaining the signature from the customer, the merchant is allowed to electronically charge a return fee to the customer if the check is later returned after ACH processing. Such return fees result in significant contributions to some companies' bottom lines. Thus, such merchants are faced with a difficult decision as to whether they should request such a signature from a customer or not.

Figure 1:
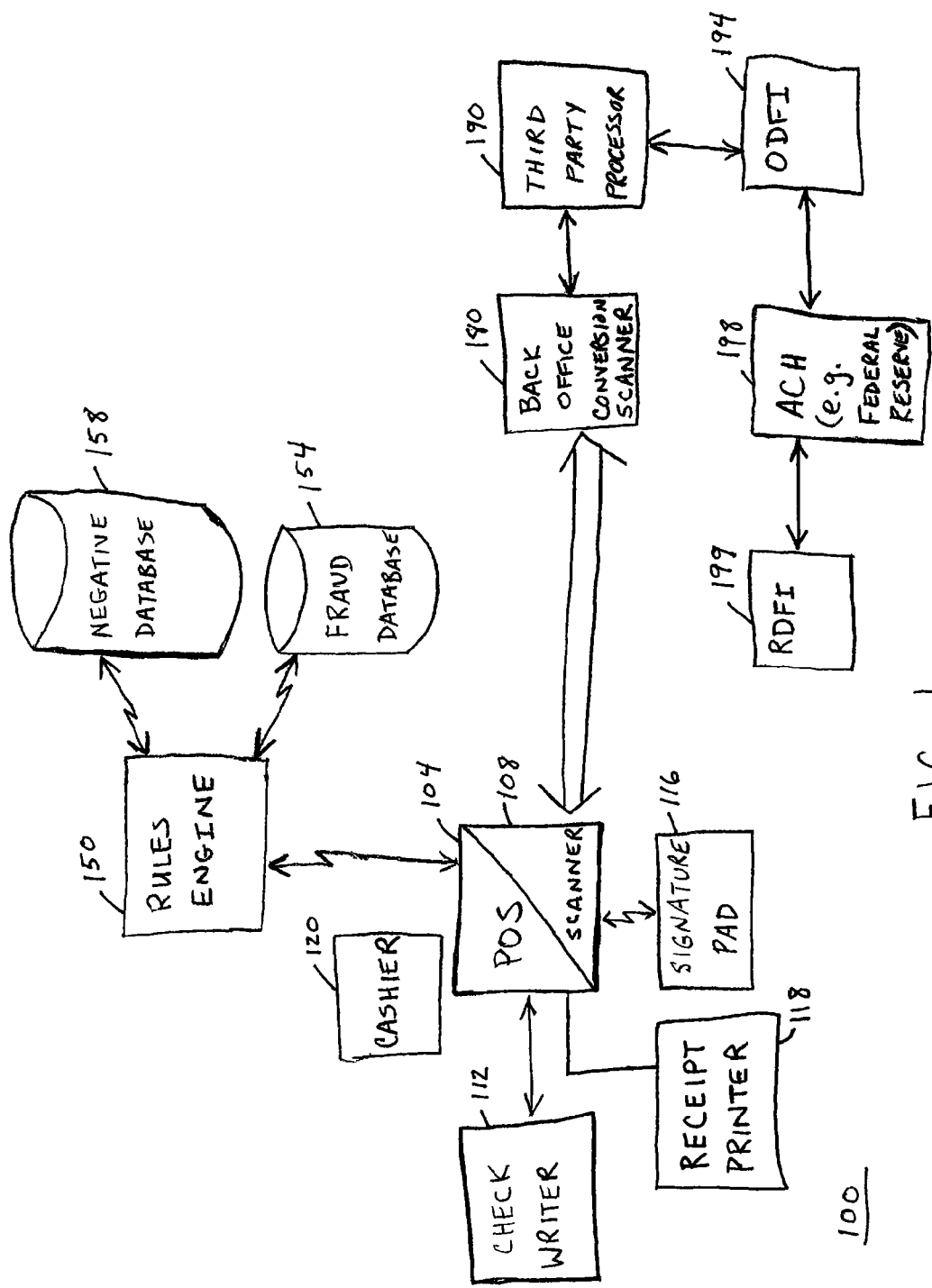
FIG. 1 illustrates a system for collecting signatures at a point of sale device for authorizing electronic collection of return fees after a check instrument is submitted at the point of sale device, in accordance with one embodiment of the invention.

In accordance with one embodiment of the invention a system 100 is provided to address this concern in an efficient manner. As shown in FIG. 1 a check writer/customer 112 presents a check to a cashier 120 at a point of sale device 104. The point of sale device is equipped with a signature pad 116, such as the signature pad used for credit cards or debit cards. In fact, the same signature pad used for processing credit cards and debit cards that require signature, can be utilized to capture the signature of the check writer at the time the check writer presents a check. This allows the signature pad to not only provide notice to the check writer that the check will be processed in accordance with ACH processing, but also to notify the check writer via the signature pad display that a return fee will be charged to the check writer's checking account if the check is returned. Then, the check writer can execute his or her signature on the signature pad so as so indicate his or her consent to such terms. The cashier at the point of sale can then place the check in the drawer and provide it for back office conversion at the end of his or her shift.

Alternatively, the system can be configured with a receipt printer 118. The receipt printer can be configured to print a receipt that states the terms and conditions for payment by check in accordance with the NACHA rules for notification. In addition, the receipt can state that if the check is returned that the customer agrees to be electronically charged a returned check fee, such as a specific fee or the maximum fee available. This statement will be at the discretion of the merchant or the merchant's check processor, in most instances. The receipt can then be printed and the customer can then sign, or the signature can be electronically captured and the receipt is printed with a copy of the electronic signature. The receipt is then handed back to the checkwriter and a copy is kept for the merchant.

When a receipt is generated, it can be assigned an identifier that allows it to be associated with a transaction. This will allow the signed receipt to be matched with the corresponding check. For example, when an electronic signature is captured, the electronic signature can be stored along with an image of the check—whether the image of the check is created at the point of sale device or via the back office scanner. Similarly, a signed paper receipt can be scanned (e.g., with scanner 108) so as to create an image of the receipt. The image of the paper receipt can then be associated with the corresponding check or image of that check. This will facilitate submission of the receipt image electronically if it is ever requested to verify that the return fee may be collected by the merchant.

The code printed on a paper receipt could be generated from an algorithm that uses transaction details as an input to produce the identifier as an output. Alternatively, the MICR information on the check could be used after being read by a magnetic reader and then used as the input to the algorithm. Or, the check could be imaged at the point of sale device and data could be optically read from the check image using optical character recognition (OCR) to generate the identifier.

Back office conversion can be implemented by using scanner 180 to scan checks from a cashier's drawer so as to create an optical image of the check. This optical image can be converted using optical character recognition (OCR) to capture pertinent data elements from the check. Those data elements can then be combined in a data file and provided to an Originating Depository Financial Institution (ODFI) 194 or a third party processor 190. Once the data file is conveyed to the ODFI (either directly from the merchant or by the third party processor), the ODFI can then forward the information for processing via an automated clearing house (ACH) 198 such as the United States' Federal Reserve. The ACH submits the check data to the appropriate Receiving Depository Financial Institution (RDFI) 199. If the RDFI determines that the account corresponding to the check does not have sufficient funds, it issues a return through the ACH to the ODFI. The ODFI subsequently notifies the merchant (or notifies the third party processor who notifies the merchant) about the return. A merchant can attempt to resubmit the check itself for a second attempt at settlement. If the item settles through the second attempt, the merchant can then electronically submit the return fee via ACH processing, since the checkwriter's signature had been obtained to authorize that. The merchant could also empower the third party processor to perform these functions on behalf of the merchant.

As an enhancement to the receipt of a check at the point of sale device, a risk management system (e.g., a risk management system including a fraud database 154 and/or a negative database 158) can be queried when a check is presented. By optically scanning a check submitted by a customer at the point of sale device, optical character recognition technology can be utilized to obtain data values from the check corresponding to different data fields on the check. For example, optical character recognition technology can be utilized to obtain the signature, the personal information (such as address, telephone, and email information), the amount, and other such fields from the check. As one example, the obtained personal information could be compared against a risk management system to determine whether the obtained personal information corresponds to previous incidents of fraud where a perpetrator attempted to pass a check that contained the same or a portion of the same personal information. If there is a match, the risk management system can flag the transaction and request that the point of sale device and/or cashier request a signature from the checkwriter. Similarly, the information which has optically been read from the presented check can be queried against a negative database that is coupled with the point of sale device. The negative database could indicate previous bad checks written by the check writer or other credit risks and flag the point of sale device and/or cashier to require that a signature be collected at the point of sale device. This allows the point of sale device and/or cashier to allow some check writers who are good credit risks to proceed with the transaction without having to provide their signature while other customers who are greater credit risks are required to provide a signature. In this manner, intelligent decisions can be implemented by using business rules at either the negative database or risk management system. Similarly, the business rules could be implemented at a central store computer when multiple POS devices exist in a store. In addition, the business rules could be implemented by software at a third party processor or a central office for the business. The business rules can be implemented by a computer programmed to implement one or more business rule on the risk data. Such a computer is shown as a rules engine 150 in FIG. 1. Furthermore, the rules engine could be separate or a part of the risk management database, such as part of fraud database 154 or negative database 158 shown in FIG. 1.

Figure 2:
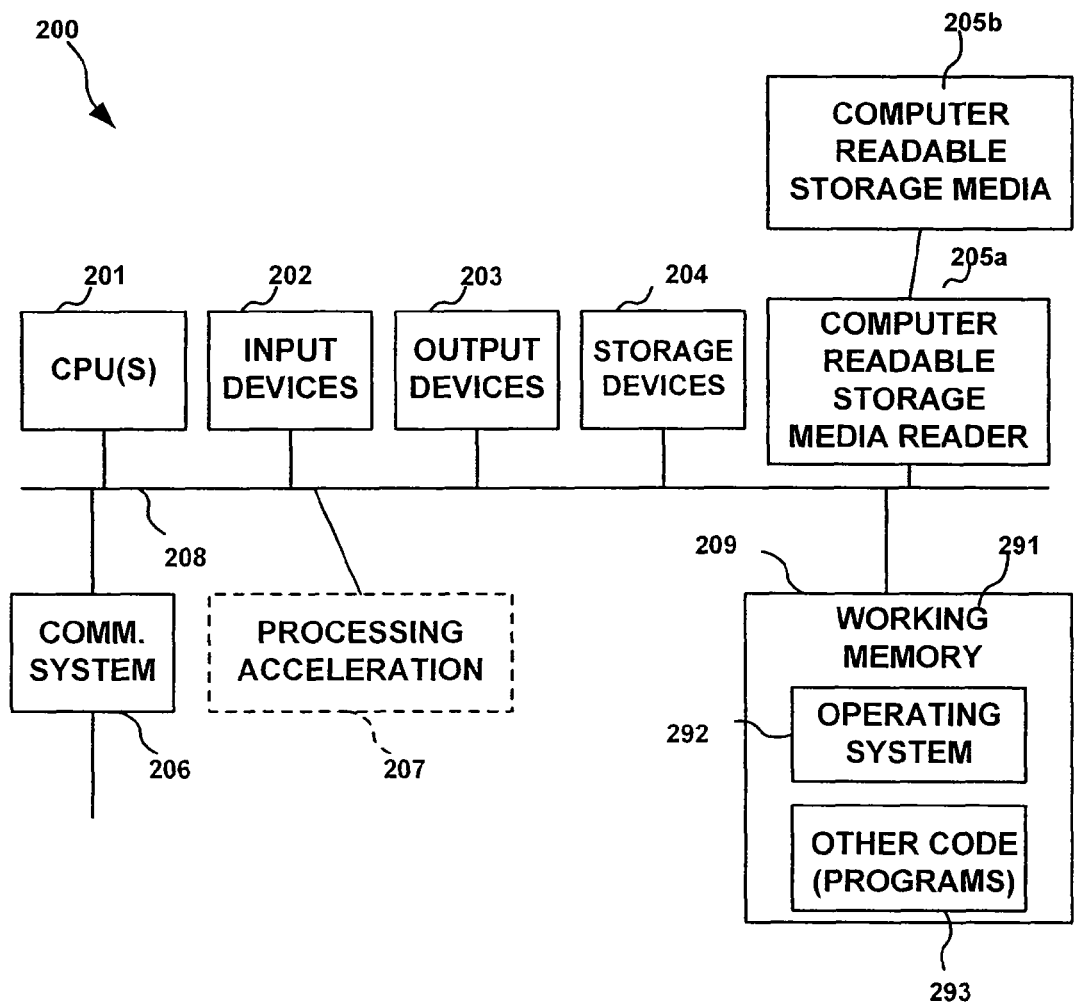
FIG. 2 illustrates a block diagram of a computing device that can be used to implement elements of FIG. 1, in accordance with one embodiment of the invention.

FIG. 1 illustrates a variety of system components that can be implemented by computers (except for the check writer/customer and the cashier). FIG. 2 illustrates a block diagram of a device that can be used to implement these devices, in accordance with one embodiment of the invention. Namely, FIG. 2 broadly illustrates how individual system elements can be implemented. System 200 is shown comprised of hardware elements that are electrically coupled via bus 208, including a processor 201, input device 202, output device 203, storage device 204, computer-readable storage media reader 205a, communications system 206 processing acceleration (e.g., DSP or special-purpose processors) 207 and memory 209. Computer-readable storage media reader 205a is further coupled to computer-readable storage media 205b, the combination comprehensively representing remote, local, fixed and/or removable storage devices plus storage media, memory, etc. for temporarily and/or more permanently containing computer-readable information, which can include storage device 204, memory 209 and/or any other such accessible system 200 resource. System 200 also comprises software elements (shown as being currently located within working memory 291) including an operating system 292 and other code 293, such as programs, applets, data and the like.

System 200 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 200 component (e.g. within communications system 206). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized.

Figure 3:
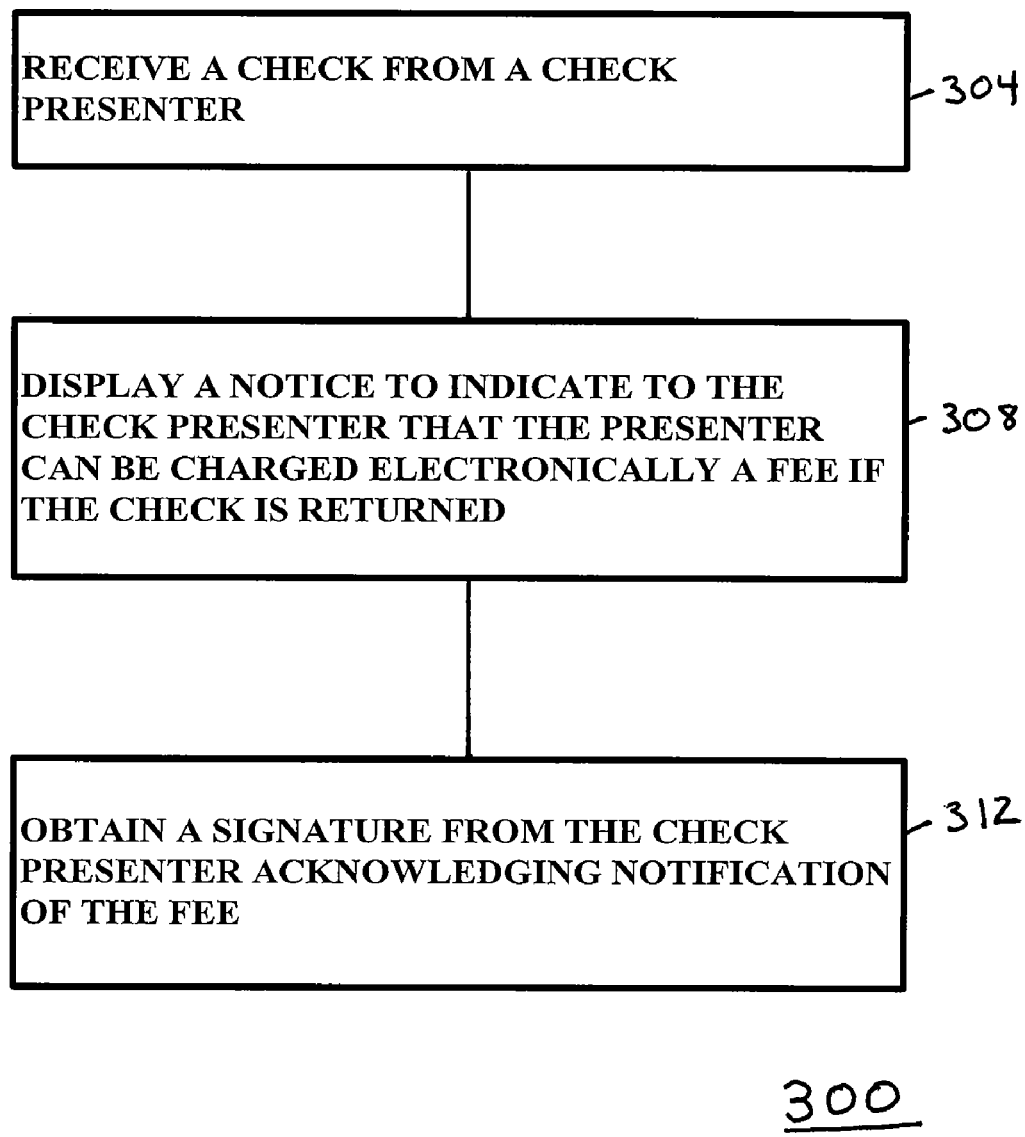
FIG. 3 illustrates a flowchart demonstrating a method of obtaining a signature from a check presenter in accordance with one embodiment of the invention.

Referring now to FIG. 3, a flowchart 300 demonstrating a method in accordance with one embodiment of the invention can be seen. In block 304, a check is received from a check presenter, such as a customer presenting a check at a point of sale device. In block 308, a notice is displayed so as to indicate to the check presenter that the presenter could be charged a fee electronically if the check is returned. For example, the checking account of the check presenter could automatically be charged with a return fee if the check is returned for insufficient funds, for example. In block 312, a signature is obtained from the check presenter so as to acknowledge that the check presenter has been notified of the fee.

Figure 4:
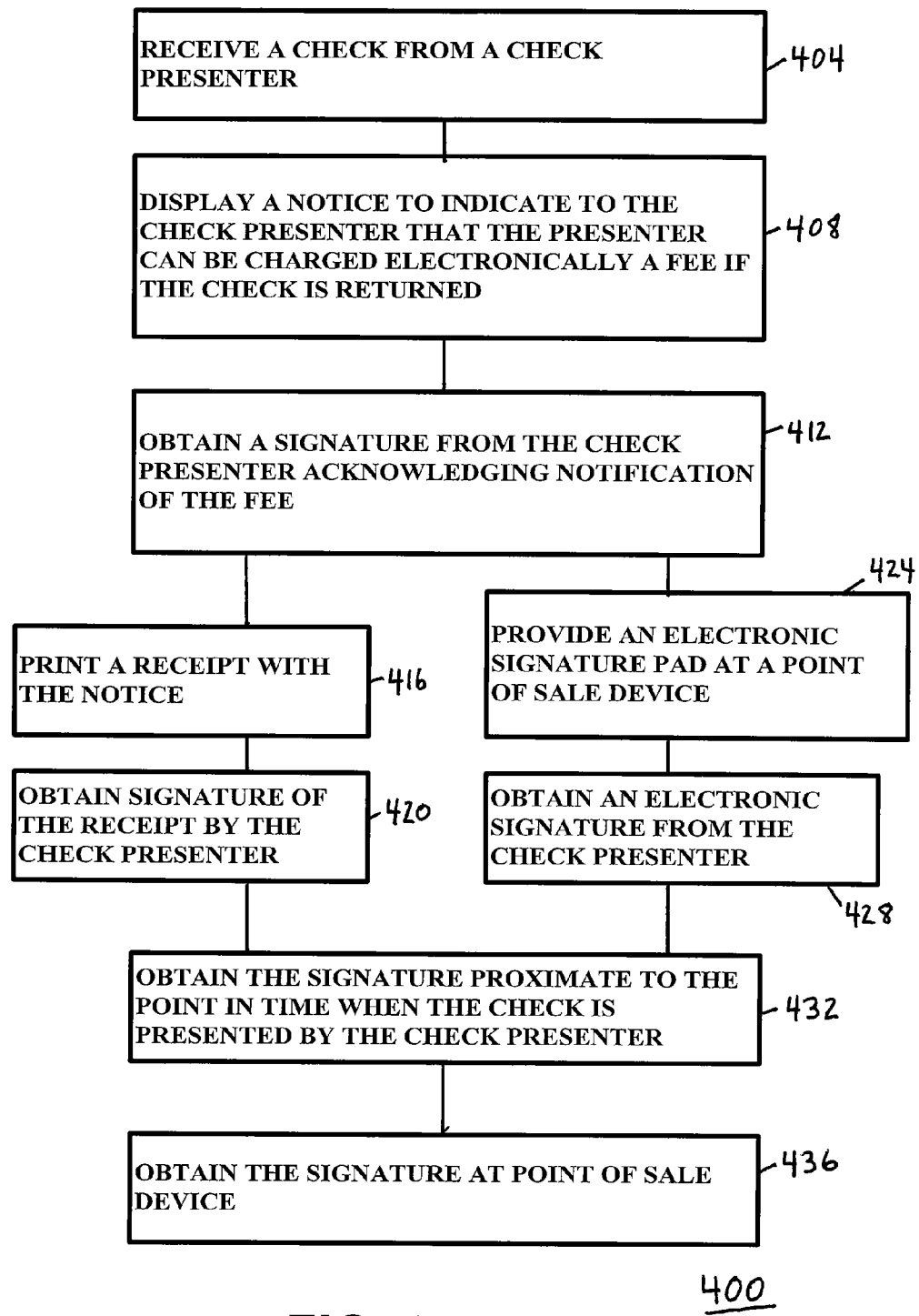
FIG. 4 illustrates a flowchart demonstrating another method of obtaining a signature from a check presenter in accordance with one embodiment of the invention.

Referring now to FIG. 4, flowchart 400 illustrates yet another embodiment of obtaining a check presenter's signature. In block 404, a check is received from a check presenter, for example by a cashier or at a point of sale device. In block 408, a notice is displayed indicating to the check presenter that the presenter can be charged a fee electronically if the check is returned, for example for non-sufficient funds (NSF). In block 412, a signature can be obtained from the check presenter wherein the signature acknowledges that the fee can be charged electronically to the customer's checking account if the check is returned, for example. Two options for obtaining signature are shown in FIG. 4. In block 416, a piece of paper such as a receipt can be printed. The paper receipt would bear the notice that the fee could be charged to the consumer if the check is returned. In block 420, the customer/check presenter could then indicate his or her assent by signing the receipt. A carbon copy could also be used to allow the store to keep a version and the customer to keep a version of the signed receipt.

Alternatively, a signature pad could be used to capture the check presenter's signature. As shown in block 424, an electronic signature pad could be provided at the point of sale device. A notice could then be displayed to the check presenter so as to notify the check presenter of the return fee being electronically charged to his/her checking account if the check is returned, for example. The check presenter could then be asked to use the signature pad to provide an electronic signature, as shown by block 428.

Yet another option that is not shown in FIG. 4 is to display the notice to the check presenter; obtain the check presenter's signature via the signature pad; and then to print out the notice and signature on a piece of paper or as part of the receipt for items purchased. This would allow the check holder to have a physical copy while the store retains an electronic copy without having to perform a scanning process on a physically signed paper.

Block 432 illustrates that the signature can be obtained at a point in time that is proximate to the time when the check is presented. Thus, it is assumed that when a person presents a check at a grocery store, for example, that the signature of the check presenter will be obtained when the check presenter goes through the check out line. For example, the signature will be obtained at a point of sale device, such as the cashier stand or automated check out station, as illustrated by block 436.

Figure 5:
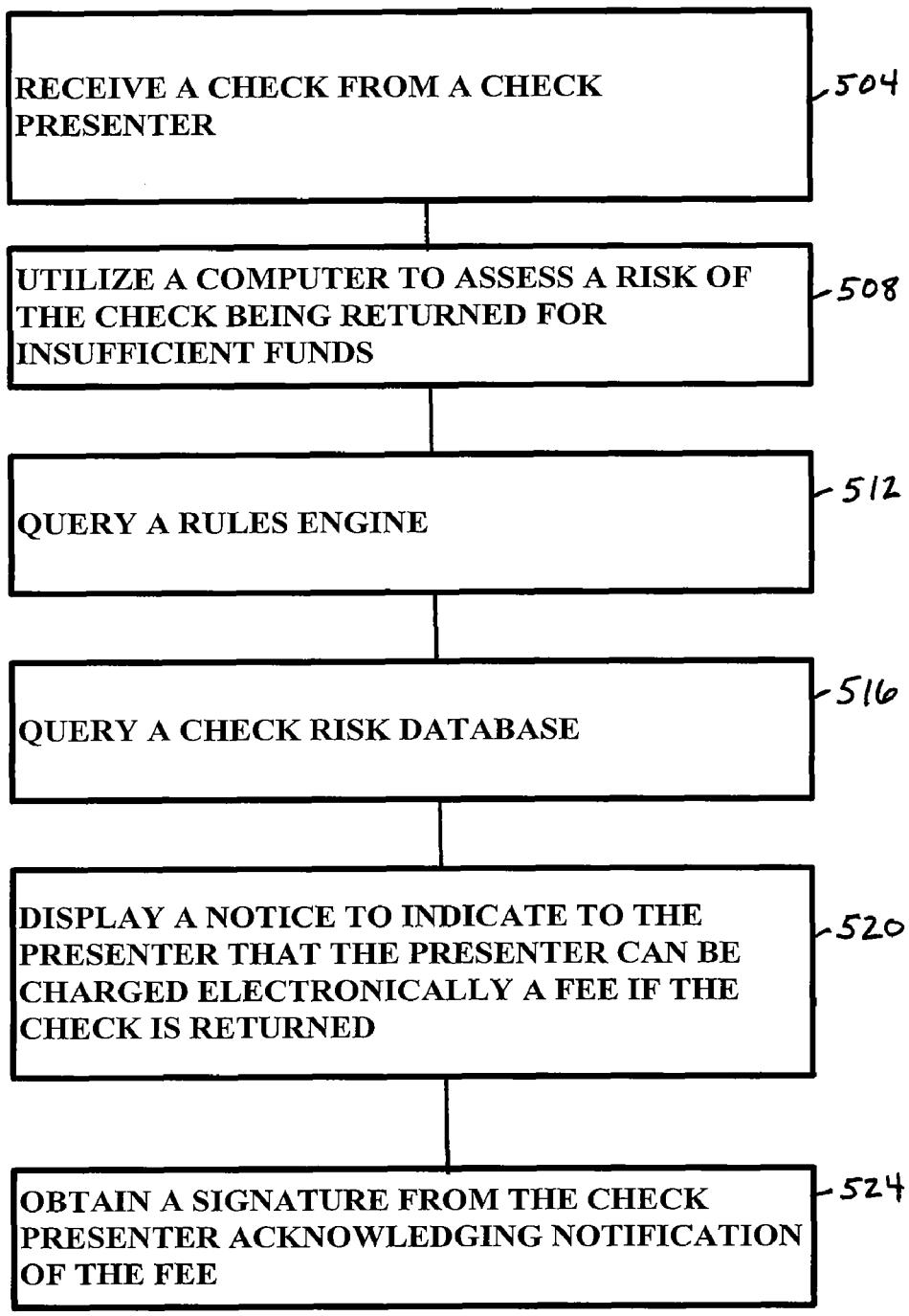
FIG. 5 illustrates a flowchart demonstrating a method of determining whether a signature is needed from a customer presenting a check in accordance with one embodiment of the invention.

FIG. 5 illustrates a flowchart demonstrating a method of determining whether a signature should be obtained from a check presenter in order to allow the check presenter's checking account to be charged a return fee if the check is later returned for non-sufficient funds, for example. As shown in flowchart 500, for example, block 504 shows that a check is received from a check presenter. In block 508, a computer is utilized to assess the risk of the check being returned for insufficient funds. This can be accomplished, for example, by querying a rules engine with data from the transaction, as shown in block 512. Such data could be the name on the check or an image of the check that is scanned at the point of sale device. The rules engine could also query a check risk database, as shown in block 516. The check risk database could be a fraud database that contained information about previous fraudulent transactions or a negative database that contained data about prior checks of the check presenter that were returned for non-sufficient funds. If it is determined that the risk of the check being returned is sufficiently high, then a signature can be obtained from the check presenter so as to allow a fee to be electronically charged to the check presenter's checking account. This can be accomplished by displaying a notice to the check presenter to indicate to the check presenter that the presenter can be charged a fee electronically if the check is returned, as shown by block 520. And then obtaining a signature from the check presenter acknowledging that he or she has read and understood the notification, as shown by block 524.

Figure 6:
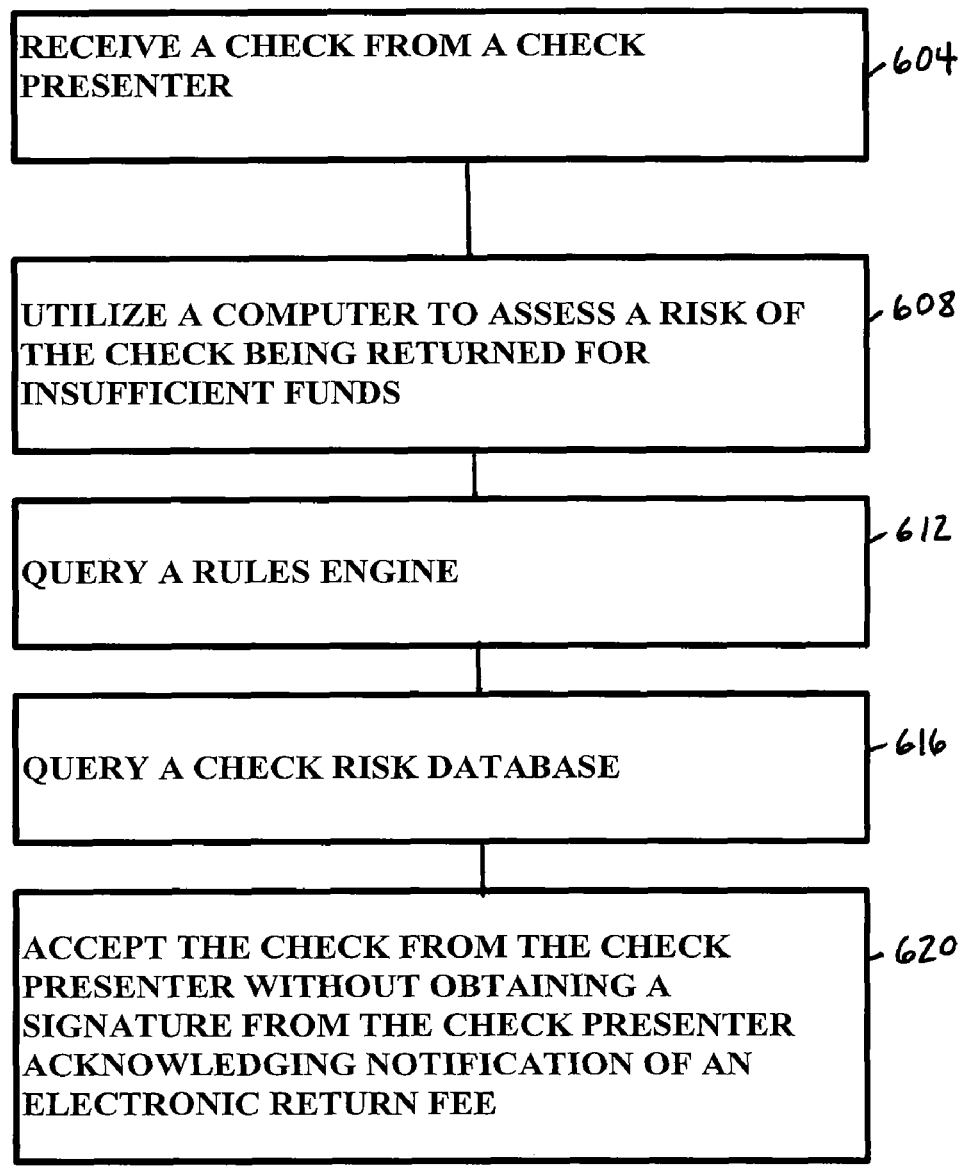
FIG. 6 illustrates a flowchart demonstrating another method of determining whether a signature is needed from a customer presenting a check in accordance with one embodiment of the invention.

Referring now to FIG. 6, yet another embodiment of the invention can be seen. FIG. 6 illustrates a method of determining whether a signature should be obtained from a check presenter and then not actually obtaining the signature. In flowchart 600, block 604 shows that a check is received from a check presenter. In block 608, a computer is utilized to assess a risk of the check being returned for insufficient funds. This can be accomplished utilizing, for example, a query to a rules engine, as shown in block 612 and/or a query to a check risk database, as shown in block 616. If it is determined that the risk of the check being returned is insufficiently high to justify getting a signature from the check presenter, then the check can be accepted from the check presenter without obtaining a signature from the check presenter acknowledging notification of an electronic return fee charged to the check presenter, as shown by block 620.

Figure 7:
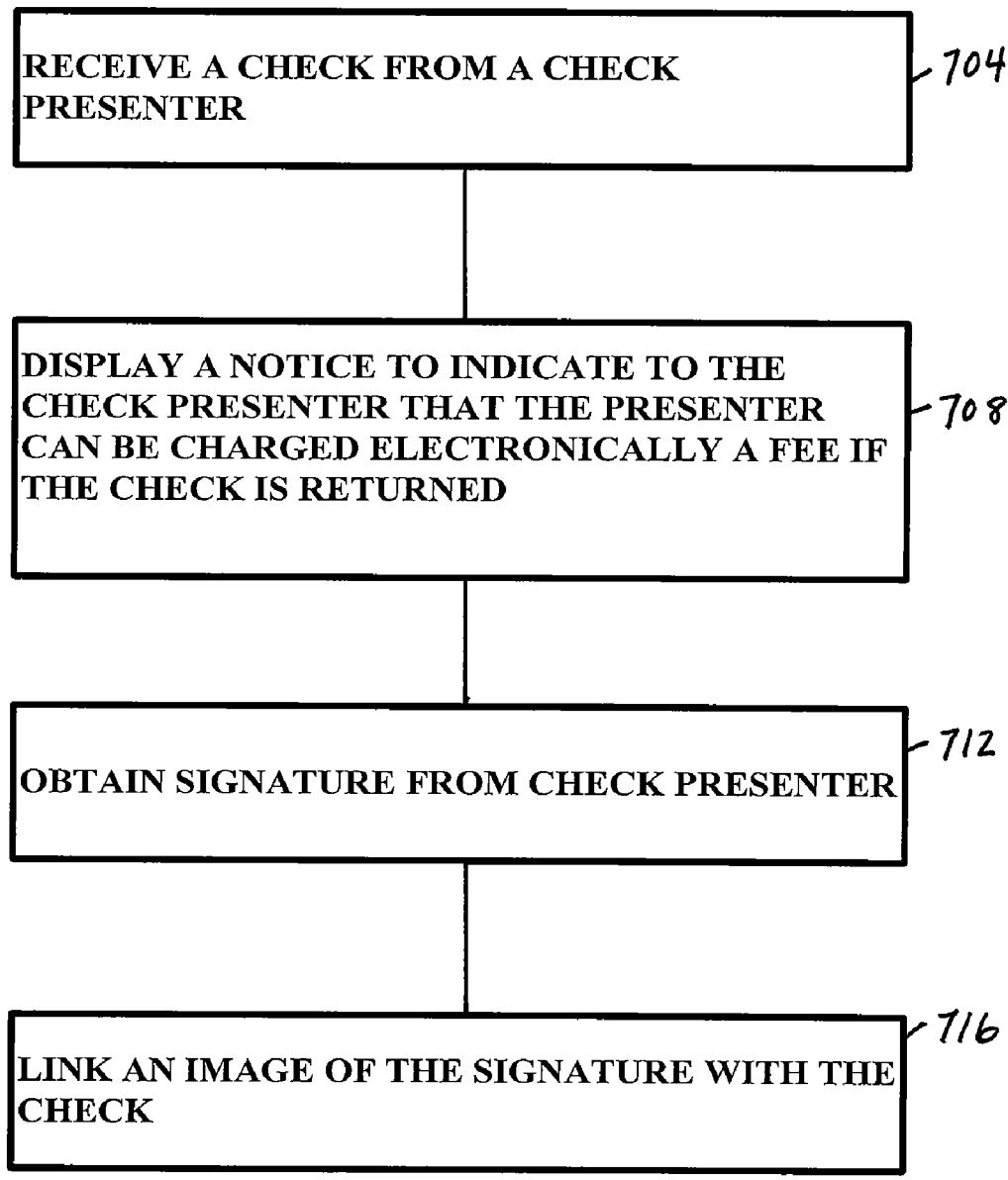
FIG. 7 illustrates a flowchart demonstrating a method of linking an image of a checkwriter's signature with a check in accordance with one embodiment of the invention.

FIG. 7 illustrates a flowchart 700 demonstrating a method in accordance with yet another embodiment of the invention. This embodiment deals with linking the signature obtained from the check presenter with the check that was presented. It is envisioned that at some point in time it might be necessary to prove that the check presenter agreed to be charged the fee for a returned check. In that instance, it will be important to be able to link the obtained signature to the check that was presented and later returned—for non-sufficient fees, for example. In block 704, a check is received from a check presenter. A notice can then be displayed to indicate to the check presenter that the check presenter can be charged a fee electronically if the check is later returned. This is shown by block 708. In block 712, a signature of the check presenter is obtained, acknowledging the notice. And, in block 716, the signature is linked to the check. The linking can be performed in a variety of ways. Merely by way of example, the signature can be captured via a signature pad and saved with an image of the check in a file. Or, a receipt could be printed with an identifier that is also stamped on the check. The receipt could then be signed and kept by the merchant. Or, data from the check could be input into an algorithm to produce a number result. That number could be associated with the captured signature. A variety of measures could be implemented so as to link the signature with the check.

Figure 8:
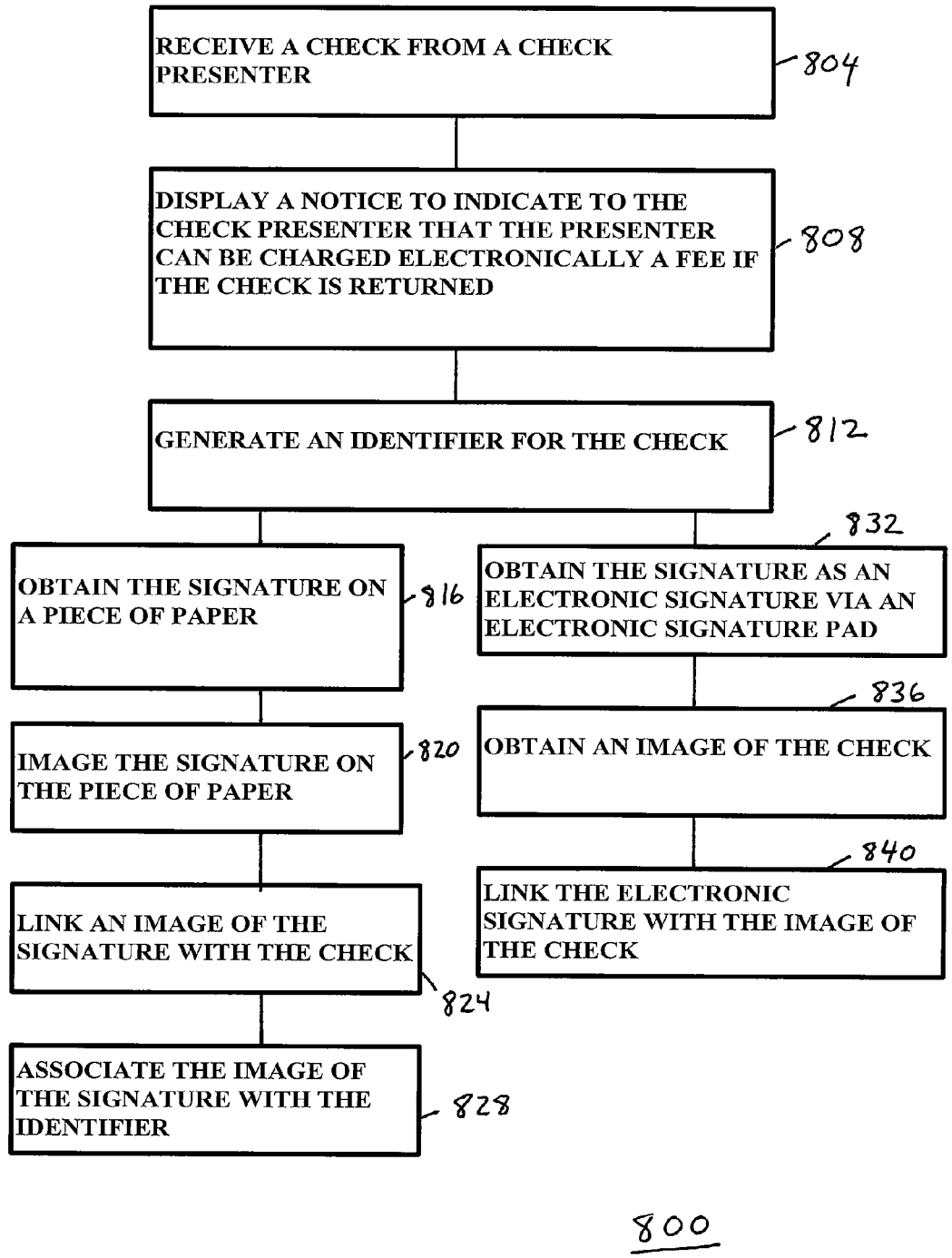
FIG. 8 illustrates a flowchart demonstrating another method of linking an image of a checkwriter's signature with a check in accordance with one embodiment of the invention.

Referring now to FIG. 8, another embodiment can be seen. In flowchart 800, block 804 shows that a check is received from a check presenter. Block 808 illustrates that a notice is displayed to indicate to the check presenter that the presenter can be charged a fee electronically to the check presenter's checking account by the merchant if the check is returned. In block 812, an identifier can be generated for use in associating the check with the signature. For example, the identifier could be a number generated by an algorithm based upon data appearing on the check. As noted above, the signature can be linked to the check in a variety of ways. For example, in block 816, the signature can be obtained on a piece of paper. The signature on the paper can then be imaged as shown by block 820. Alternatively, the image of the signature could be captured via an electronic signature pad. The image of the signature can then be linked with the check, as shown by block 824. For example, as shown in block 828, the image of the signature could be associated with the identifier generated in block 812.

Alternatively, an electronic signature can be obtained using an electronic signature pad as shown in block 832. Furthermore, an image of the check can be obtained, as shown by block 836. The electronic signature can then be linked with the image of the check as shown in block 840. This data set can then be stored on a computer, such as a merchant computer.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:
1. A method for processing a check comprising:
receiving a check from a check presenter at a transaction device;
collecting, at the transaction device, data from the received check and data pertaining to the check presenter;
utilizing a computer to assess, based on the collected data, a credit risk of said check presenter;
when the credit risk of the check presenter is good as assessed by the computer, accepting said check from said check presenter at the transaction device for elec- tronic processing without obtaining a signature from said check presenter acknowledging notification of an electronic return fee;

when the credit risk of the check presenter is not good, as assessed by the computer, accepting the check from said check presenter, at the transaction device, for electronic processing, displaying electronically, at the transaction device, a notification that said check presenter can be charged electronically a fee, if said check is returned, and obtaining, proximate to the point in time when said check is presented, by said check presenter, a signature from said check presenter, at the transaction device, acknowledging notification of said fee; and configuring a computer so as to charge said fee electronically if said check is later returned, when a signature has been obtained from said check presenter.

2. The method as claimed in claim 1 wherein said utilizing said computer to assess a credit risk comprises:
querying a check risk database.

3. The method as claimed in claim 2 wherein said check risk database comprises negative information about check writers.

4. The method as claimed in claim 2 wherein said check risk database comprises information relating to check fraud.

5. The method as claimed in claim 1 wherein said utilizing said computer to assess a credit risk comprises:
querying a rules engine.

6. The method as claimed in claim 1 wherein said obtaining said signature comprises:
obtaining said signature as an electronic signature via an electronic signature pad.

7. The method of claim 1, wherein displaying electronically a notification comprises displaying a notice, via an electronic display.

8. The method of claim 7, wherein the electronic display is comprised in an electronic signature pad, and wherein obtaining, proximate to the point in time when said check is presented by said check presenter, a signature from said check presenter acknowledging notification of said fee comprises obtaining the signature via the electronic signature pad.

9. The method of claim 1, further comprising:
utilizing a computer to link an image of said signature with said check.

10. The method as claimed in claim 9 wherein said utilizing a computer to link said image of said signature comprises:
obtaining said signature as an electronic signature via an electronic signature pad;
obtaining an image of said check;
linking said electronic signature with said image of said check.

11. The method as claimed in claim 9 wherein said utilizing said computer to link said image of said signature comprises:
obtaining said signature on a piece of paper;
imaging said signature on said piece of paper.

12. The method as claimed in claim 9 wherein said utilizing said computer to link comprises:
generating an identifier for said check;
associating said image of said signature with said identifier.

13. The method of claim 1, wherein displaying electronically a notification to indicate to said check presenter that said presenter can be charged electronically a fee if said check is returned further comprises electronically printing a paper with the notice.

14. The method of claim 13, wherein printing said paper with said notice comprises printing said paper on a receipt printer coupled to a point of sale device.

15. The method of claim 1, wherein the transaction device is a point of sale device.

* * * * *